Figure 1:
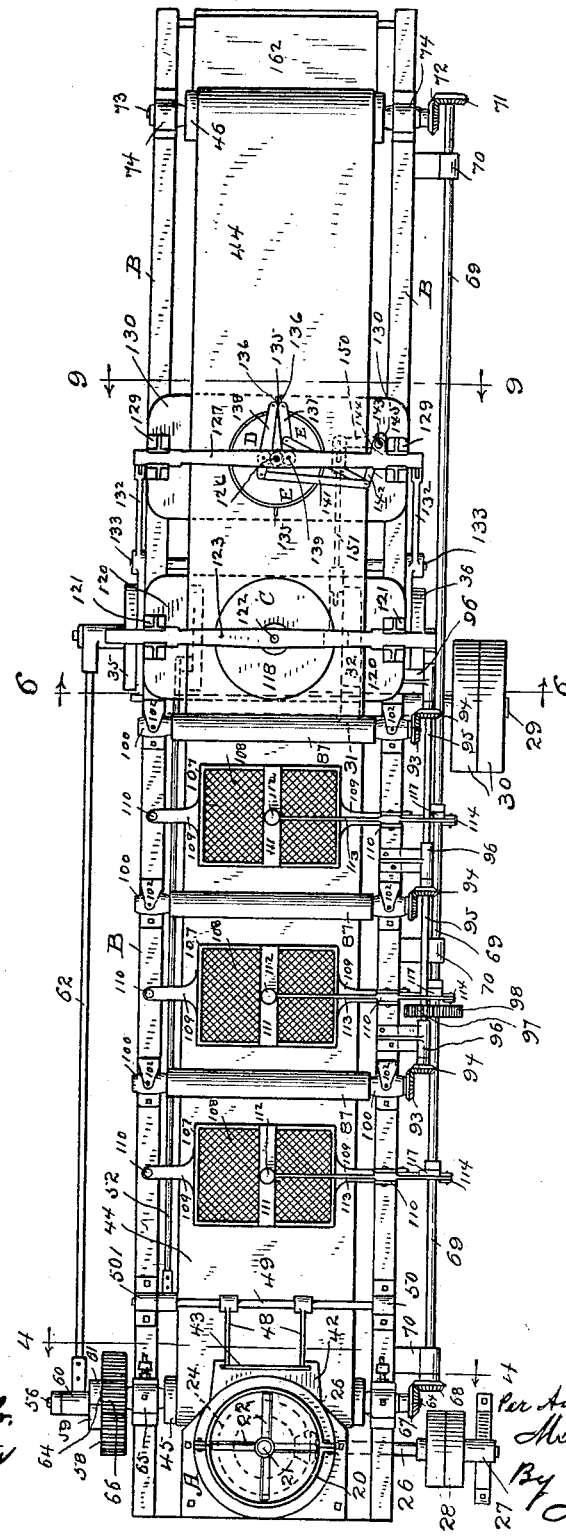

No. 768,914. PATENTED AUG. 30, 1904.
P. A. SODERHOLM & M. OLSON.
MACHINE FOR MAKING SWEDISH HARD BREAD.
APPLICATION FILED FEB. 11, 1904.
NO MODEL. 5 SHEETS—SHEET 1.

WITNESSES.
H. A. Lamb.
S. W. Atherton.

INVENTORS:
Per August Soderholm
Mauritz Olson
By A. M. Wooster
Atty.

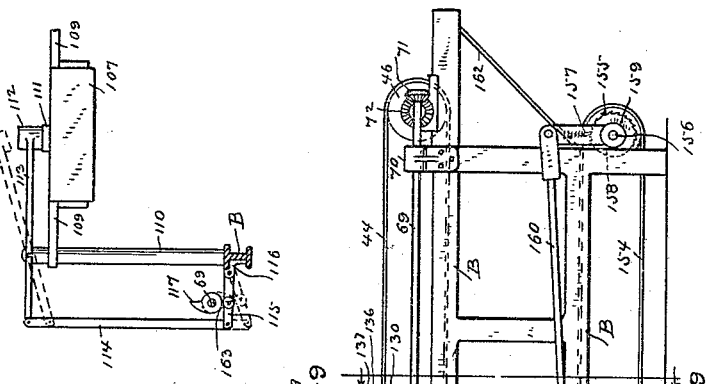

No. 768,914. PATENTED AUG. 30, 1904.
P. A. SODERHOLM & M. OLSON.
MACHINE FOR MAKING SWEDISH HARD BREAD.
APPLICATION FILED FEB. 11, 1904.
NO MODEL. 5 SHEETS—SHEET 3.
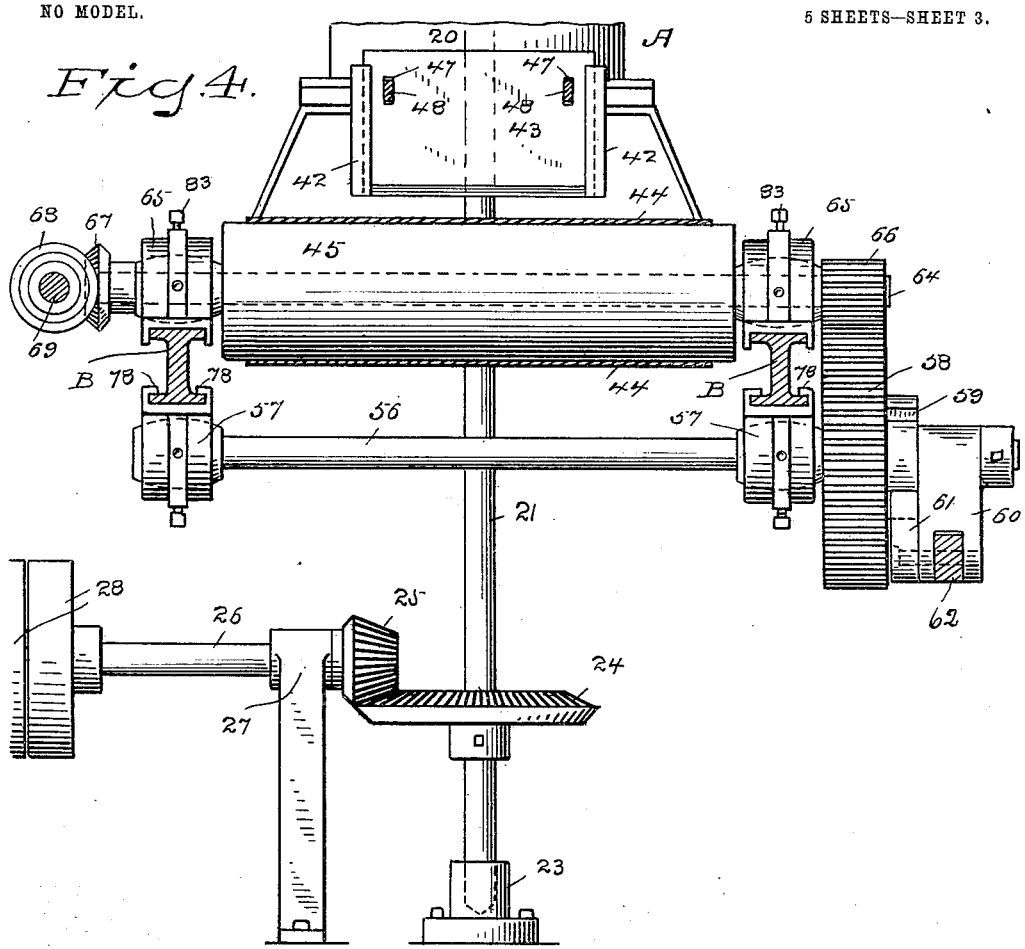
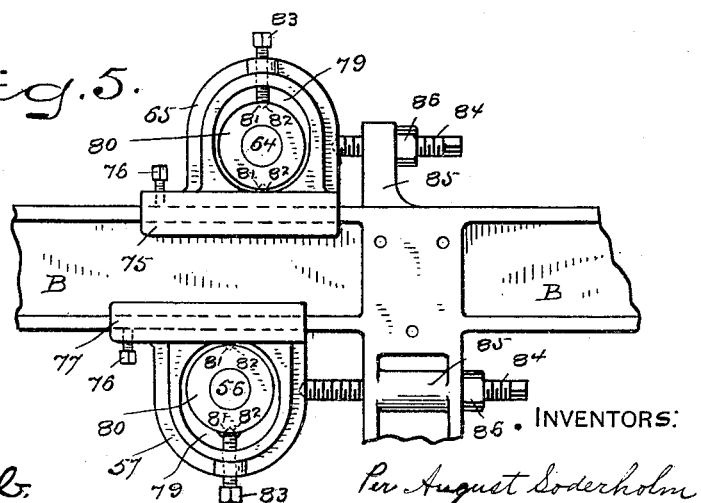
WITNESSES.
H. A. Lamb
S. W. Atherton
INVENTORS:
Per August Soderholm
Mauritz Olson
By F. W. Wooster, Atty.

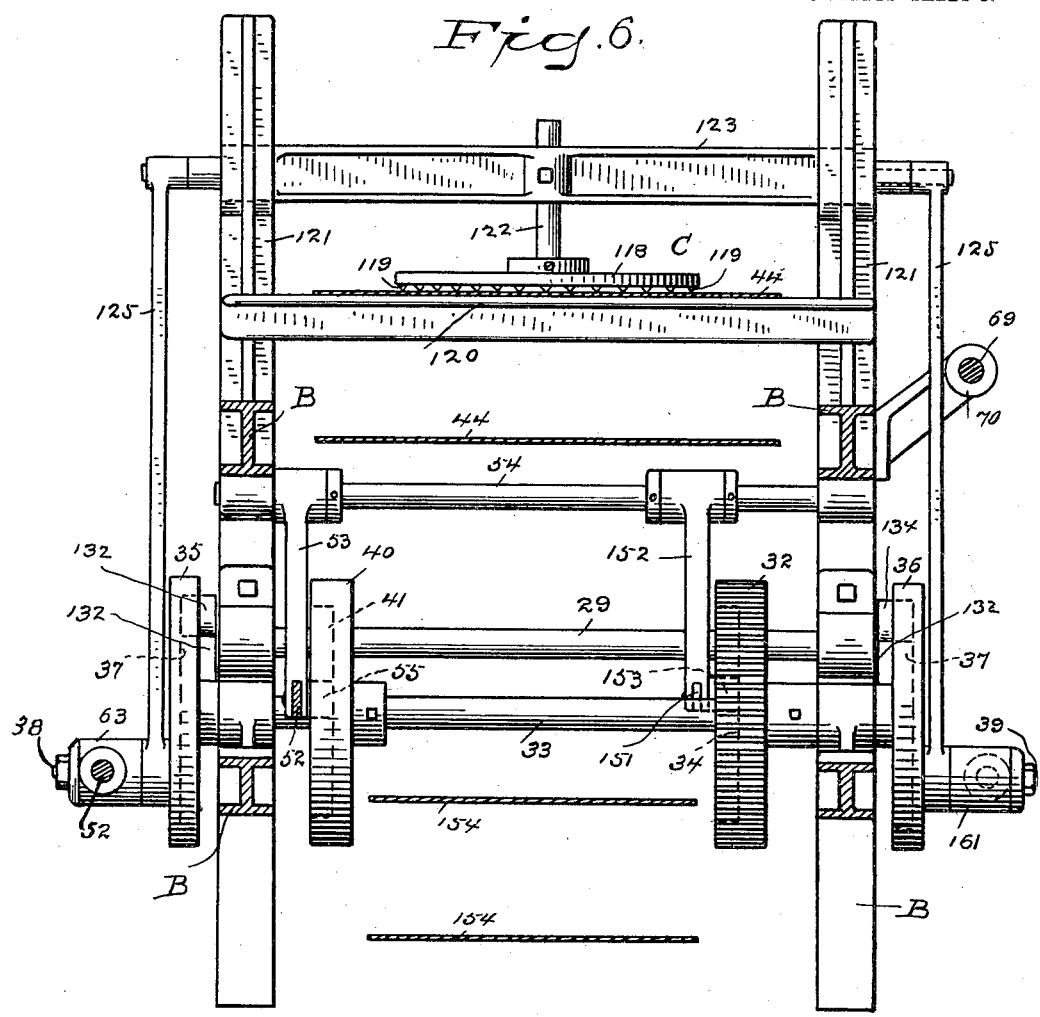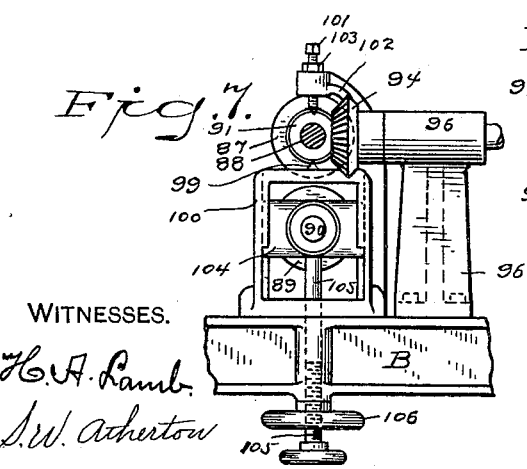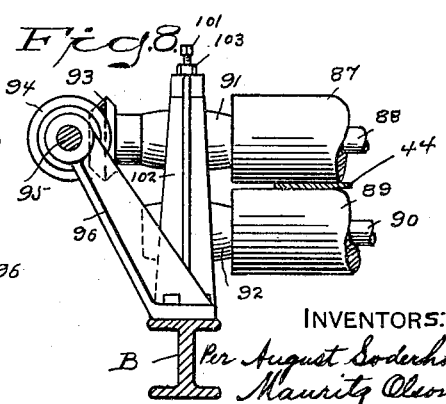

No. 768,914. PATENTED AUG. 30, 1904.
P. A. SODERHOLM & M. OLSON.
MACHINE FOR MAKING SWEDISH HARD BREAD.
APPLICATION FILED FEB. 11, 1904.
NO MODEL. 5 SHEETS—SHEET 5.
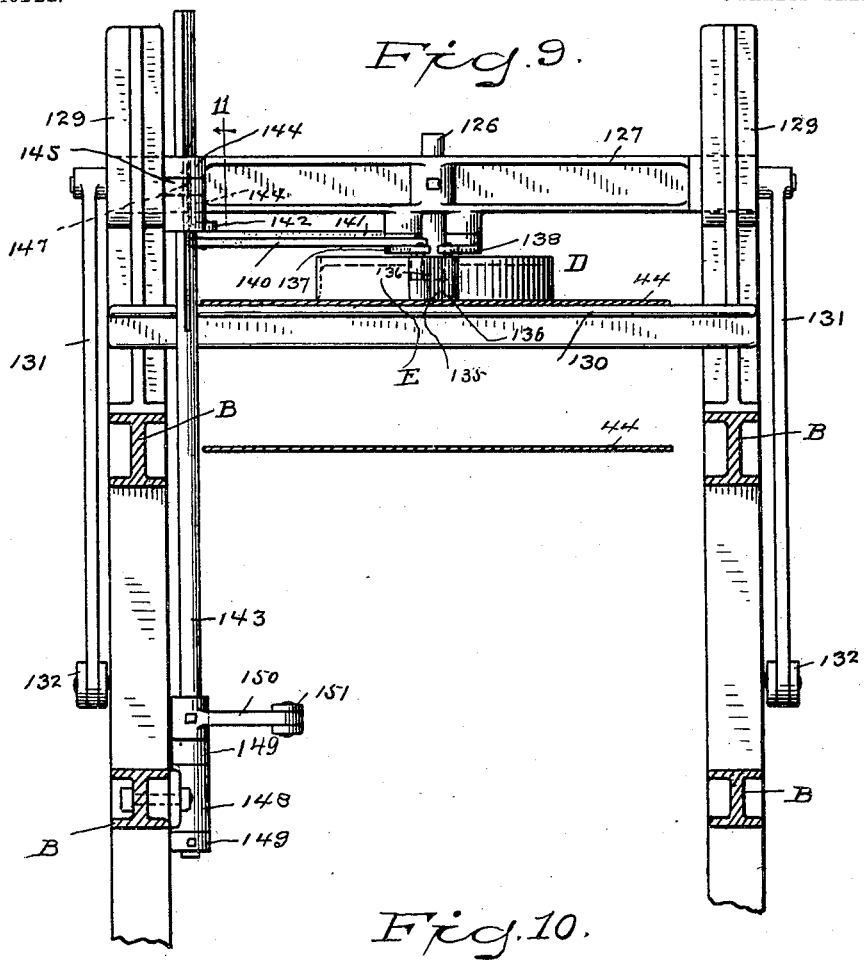
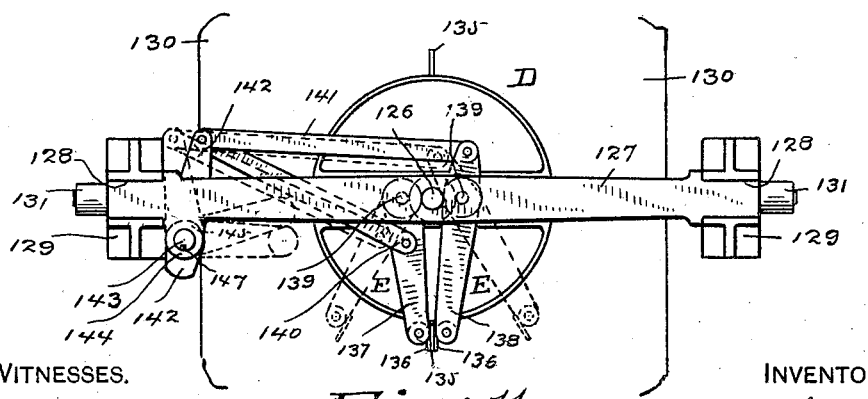
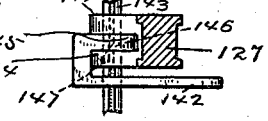
WITNESSES. INVENTORS:
H. A. Lamb. Per August Soderholm
S. W. Atherton. Mauritz Olson
By F. A. M. Wooster, Atty.

No. 768,914. Patented August 30, 1904.

UNITED STATES PATENT OFFICE.

PER AUGUST SODERHOLM AND MAURITZ OLSON, OF BRIDGEPORT, CONNECTICUT.

MACHINE FOR MAKING SWEDISH HARD BREAD.

SPECIFICATION forming part of Letters Patent No. 768,914, dated August 30, 1904.

Application filed February 11, 1904. Serial No. 193,108. (No model.)

*To all whom it may concern:*

Be it known that we, PER AUGUST SODERHOLM and MAURITZ OLSON, citizens of the United States, residing at Bridgeport, county of Fairfield, State of Connecticut, have invented a new and useful Machine for Making Swedish Hard Bread, of which the following is a specification.

This invention relates to the art of breadmaking, more especially the manufacture of "Swedish hard bread," so called—that is, a bread made entirely of coarse-rolled rye-flour.

Heretofore owing to the peculiar qualities of the flour from which dough for this bread is made, it being sticky and very hard to handle, Swedish hard bread has been made entirely by hand.

The special object of this invention is to produce a machine for making different varieties of this class of bread that will stir and mix the dough in a suitable mixer, will feed it and cut it off in suitable portions to make single loaves or cakes of the bread, will subject each portion to successive rolling operations after first dusting the portion with fresh flour, will then convey the rolled portion to a marker, which will perforate or suitably mark said portion, will then convey it to a cutter, which will cut out the loaf or cake, which we shall hereinafter refer to as the "cake," will then carry the cake forward into position to be removed for baking, and will also collect all the scrap and deliver it into a suitable receptacle, from which it may be returned to the mixer. The machine in use requires three operators—one to attend to the feed and two to remove the cakes from the machine. These three operators with the machine running at moderate speed can make twenty-eight cakes per minute. With an additional operator the machine can be speeded to make forty cakes per minute. By hand three men can make seven cakes per minute and five men can make fourteen cakes per minute.

With the above stated and other objects in view the invention consists in certain constructions and in certain parts, improvements, and combinations, which will be hereinafter described and then pointed out in the claims hereunto appended.

In the accompanying drawings, forming a part of this specification, in which like characters of reference indicate the same parts, Figure 1 is a plan view of the machine complete; Fig. 2, a side elevation as seen from the direction of the bottom of the sheet in Fig. 1; Fig. 3, a detail view illustrating the construction and mode of operation of one of the flour-sifters and the accompanying tapping mechanism; Fig. 4, a transverse section, on an enlarged scale, on the line 4 4 in Figs. 1 and 2 looking toward the left; Fig. 5, a detail elevation, on an enlarged scale, as seen from the direction of the bottom of the sheet in Fig. 1, illustrating the means for adjusting the upper apron-carrying rolls, the bevel-pinion being removed; Fig. 6, a transverse section, on an enlarged scale, on the line 6 6 in Figs. 1 and 2 looking toward the right. Figs. 7 and 8 are detail elevations, on an enlarged scale, from points of view at right angles to each other, illustrating the means for adjusting the kneading-rolls; Fig. 9, a transverse section, on an enlarged scale, on the line 9 9 in Figs. 1 and 2 looking toward the left; Fig. 10, a detail plan view, on an enlarged scale, of the cutter and the mechanism for clearing scrap from the edge of the cutter; and Fig. 11 is a detail view illustrating a portion of the mechanism for operating the scrap-clearers.

A denotes a dough-mixer, which may be of any ordinary or preferred construction, as the special form of mixer used is not of the essence of our present invention. The mixer is mounted at one end of the frame of the machine, which we have indicated as a whole by B, it being understood, of course, that the style and design of the framework may be varied to an unlimited extent to conform to the requirements of special machines without departing from the principle of the invention. In the present instance we have shown a mixer comprising a reservoir 20 and a vertical shaft 21, carrying a plurality of arms 22, which are inclined to the horizontal plane, as indicated in Fig. 1, in such a manner as to force the dough downward and outward. Shaft 21 is stepped upon the floor, as at 23, (see Figs. 2 and 4,) and carries a beveled gear-wheel 24, which meshes with a bevel-pinion 25 on a short shaft 26, journaled in bearings 27 and carrying belt-pulleys 28, one of which is fast, the other loose. All of the other operative parts of the machine are driven from a shaft 29, which we will call the "driving-shaft," journaled on the frame at approximately the center of the machine. This shaft carries belt-pulleys 30, one being fast and the other loose, and a pinion 31, which meshes with a gear-wheel 32 on a shaft 33, which for convenience we will call the "main shaft." Gear-wheel 32 is provided on its inner face with a cam-groove 34 (see dotted lines, Fig. 6) and at its opposite ends with disks 35 and 36, which are provided in their inner faces with cam-grooves 37 (see dotted lines, Fig. 6) and on their outer faces with crank-pins 38 and 39. 40 denotes another disk, carried by shaft 33, which is provided in its face with a cam-groove 41. (See dotted lines, Fig. 6.) The functions of the several cam-disks and crank-pins carried by shaft 33 will presently be fully explained.

Commencing at the left end of the machine, as seen in Figs. 1 and 2, the first operation of the machine to be described is the feed and cut-off. We have already briefly described the mixer, which, however, need not be of any special construction. The reservoir is provided with a spout 42, leading downwardly from the bottom thereof. This spout is provided with a sliding gate or cut-off 43, which is raised at the proper moment to permit the dough forced downward into the spout by the arms of the mixer to pass out and is then pressed downward again at the proper moment to cut off a suitable portion of dough to make a single cake of the bread, the cut-off and the edge of the spout forming the cutting edges. The portions of dough as they leave the mixer pass upon an endless apron 44, which extends the entire length of the machine, passing over rollers 45 and 46, carried by shafts journaled upon the frame at the opposite ends thereof. The cut-off is shown as provided in its outer face with sockets 47, which are engaged by arms 48, extending from a rock-shaft 49, which is mounted in standards 50, extending upward from the frame. 51 denotes another arm extending from the rock-shaft, to which a rod 52 is pivoted. The other end of rod 52 is pivoted to an arm 53, the opposite end of which is mounted to oscillate on a cross-rod 54, extending from side to side of the frame, as clearly shown in Fig. 6. Arm 53 also carries a roller 55, which engages the cam-groove 41 in disk 40, carried by shaft 33. It will be readily understood, therefore, that the rotation of disk 40 through the engagement of roller 55 with the cam-groove will cause oscillation of rock-shaft 49 and through the engagement of arms 48 with the cut-off will open and close the latter, causing it to cut off portions of dough of suitable size to make cakes of hard bread as the dough is forced into the spout from the mixer. Owing to the fact that the cutting-off operation takes place at the end of the spout, there will be no liability of an incomplete separation of the cut-off portion of the dough from that in the mixer, thereby preventing a withdrawal of an excess quantity of the dough from the mixer.

The rollers 45 and 46, which carry endless apron 44, operate with a step-by-step movement imparted as follows: 56 denotes a shaft journaled in bearings 57, depending from the frame and adjustable thereon, as will presently be fully explained. This shaft carries a gear-wheel 58 and a ratchet 59. (See Fig. 4.) 60 denotes an arm depending from shaft 56 and mounted to oscillate thereon. This arm carries a pawl 61, which engages the ratchet and imparts forward movement thereto when the arm is swung in one direction, passing backward over a tooth of the ratchet when the arm is swung in the opposite direction. 62 denotes a rod one end of which is pivoted to the lower end of arm 60, the other end being connected to a sleeve 63, which turns freely on crank-pin 38, extending from disk 35 on shaft 33. It will be obvious, therefore, that rotation of disk 35 will impart oscillatory movement to arm 60 and through the engagement of the pawl with the ratchet will impart a step-by-step movement to shaft 56. Roller 45, which carries the left end of apron 44, is carried by a shaft 64, journaled in bearings 65 upon the frame and adjustable thereon, as will presently be fully explained. Shaft 64 carries a pinion 66, which meshes with gear-wheel 58 on shaft 56, whereby motion is imparted to shaft 64. At the opposite end of shaft 64 is a bevel-pinion 67, which meshes with a bevel-pinion 68 on a shaft 69, mounted in bearings 70 upon the frame and extending approximately the length thereof, as clearly shown in Figs. 1 and 2. At the opposite end of shaft 69 is a bevel-pinion 71, which meshes with a bevel-pinion 72 on a shaft 73, which carries roller 46, which in turn carries the right end of endless apron 44. The bearings for shaft 73 may or may not be made adjustable on the frame, as preferred. Bearings 57 and 65 for shafts 56 and 64, respectively, are, however, made adjustable on the frame, as clearly shown in Fig. 5, which see in connection with Fig. 4. Bearing 65 is provided with a shoe 75, which rests upon and is adapted to slide upon the top of the frame and is locked in position after adjustment by a set-screw 76. Bearing 57 is provided with a shoe 77, which depends from the frame and is adapted to slide thereon, said shoe being provided with flanges 78, which hook over the frame and retain the bearing in position thereon, as clearly shown in Fig. 4. A set-screw 76 locks the bearing in position after adjustment. Both bearings are provided with openings 79, which loosely receive bearing-sleeves 80, in which the shafts are journaled. These sleeves are provided in opposite sides with sockets 81. The inner sockets receive teats 82 upon the inner sides of the openings, and the outer sockets receive the ends of set-screws 83 in the outer sides of the bearings. It will be seen that the engagement of these teats and set-screws with the sleeves permits slight oscillation of the sleeves in the horizontal plane, and consequently permits independent adjustment of the ends of the shafts, so that either end of either shaft may be adjusted without danger of springing the shaft, and both sides of the endless apron may be kept taut. 84 denotes set-screws in brackets 85 upon the frame, which bear against the sides of the bearings 65 and by which said bearings may be moved toward the left, as seen in Fig. 5, to adjust either end of the apron, set-screws 76 being of course loosened in making the adjustment. The bearings at one end of these shafts only is illustrated, as the adjustments at both ends are alike. Shafts 56 and 64 are adjusted in the same manner. After making the adjustment set-screws 84 are locked in position by set-nuts 86, and set-screws 76 are of course tightened up.

The portions of dough as they are cut off at the lower end of the spout in the manner already described drop upon apron 44 and are carried by the apron through a plurality of pairs of kneading-rolls after being first dusted with rye-flour before passing to each pair of rolls. In the present instance we have illustrated a machine provided with three pairs of kneading-rolls and three dusting-boxes. The construction and operation of the kneading-rolls, which we will first describe, will be clearly understood from Figs. 7 and 8, which see in connection with Figs. 1 and 2.

87 denotes the upper kneading-rolls, which are carried by shafts 88, and 89 the lower kneading-rolls, which are carried by shafts 90. The upper kneading-roll shafts are journaled in bearing-sleeves 91 above apron 44, and the lower kneading-roll shafts are journaled in bearing-sleeves 92 below apron 44, said apron resting upon the lower rolls and being supported thereby, as clearly shown in Fig. 8, it being understood, as already stated, that the apron is kept taut. The lower kneading-rolls are not driven. The upper-kneading-roll shafts are provided with bevel-pinions 93, which mesh with bevel-pinions 94 on a shaft 95, journaled in standards 96, extending upward from the frame. Shaft 95 carries a pinion 97, which meshes with a gear-wheel 98 on shaft 69. This gear-wheel and pinion drive the shafts 95 and the upper kneading-rolls of the several pairs. The bearing-sleeves 91, in which the shaft 88 of each upper kneading-roll is journaled, are free to oscillate slightly in the horizontal plane in the same manner as shafts 56 and 64, said bearing-sleeves being engaged by teats 99, which extend from bearing-boxes 100, which themselves extend upward from the frame, and by set-screws 101, carried by brackets 102, likewise extending upward from the frame. Set-nuts 103 lock the set-screws in position after adjustment, so that the bearing-sleeves are held firmly against other movement than oscillation in the horizontal plane. The bearing-sleeves 92 of the shafts 90 of the lower kneading-rolls rest in slides 104, which are adapted to be moved vertically in bearing-boxes 100 by means of adjusting-screws 105, which pass upward through the frame and are locked in position by set-nuts 106. It will be noted that the vertical adjustment of these lower kneading-rolls determines the amount of pressure applied to the portions of dough at each kneading or rolling operation. These rolls are of course in use adjusted in accordance with the special requirements of the dough that is being worked.

As will be obvious, the lower kneading-roll acts as a support for the apron while the upper roll is in action, said lower roll being loose to permit of a free movement of the apron and prevent any tendency of a pulling movement such as might occur were the lower roll positively driven. As the kneading operation is to be carried on mechanically and with regularity in delivering the dough, the free movement of the apron is necessary. It will therefore be readily seen that by providing a rotating kneading-roll which contacts with the dough which is carried by the apron and which coacts with a loose roll located on the opposite side of the apron the material will be carried along on the apron and be kneaded while being so carried without disturbing the regular movement and delivery of the successive "batches" of dough to the successive operating mechanisms of the machine. There is therefore no requirement of a separate mechanism for kneading, nor is there a loss of time due to handling, in addition to which the cost of labor is reduced with a resultant reduction in the cost of operation.

As already stated, before each kneading or rolling operation the portion of dough is dusted with dry flour. The flour for dusting is placed in boxes 107, having sieve bottoms, (indicated by 108.) These boxes are shown as supported by means of arms 109, which engage standards 110, extending upward from the frame. The boxes are provided with cross-pieces 111, which are engaged by tapping-hammers 112, carried by levers 113, pivoted at the tops of the standards on one side of the machine—in the present instance the standards on the side toward the bottom of the sheet in Fig. 1 and toward the front in Fig. 2.

114 denotes connecting-rods, one end of each rod being pivoted to one of the levers 113 and the other end to a lever 115, (there being a lever 115 to correspond with each connecting-rod 114,) the inner end of which is pivoted to a bracket 116, extending from the frame. These levers 115 are provided with rollers 163, which are engaged by cams 117 on shaft 69. The operation of the tapping mechanism for each dusting-box will be readily understood from Fig. 3. During each rotation of shaft 69 the cams 117 will engage the rollers on levers 115 and press said levers downward, as indicated by dotted lines in Fig. 3, which by means of the connecting-rods and levers 113, will raise the tapping-hammers. As soon as the cams pass the rollers levers 115 will be released and the weight of the hammers will cause them to drop upon the cross-pieces and jar the flour-boxes sufficiently to sift the dry flour down upon the portions of dough beneath them.

After the last rolling operation—in the present instance the third—the first portion of dough to leave the mixer, still carried by apron 44, will pass to a marker or perforator, which we have indicated by C. The special form of the marker is unimportant so far as the principle of the invention is concerned. In the present instance we have shown a marker consisting of a disk 118, provided with teats or bosses 119 on its under side which mark and, if preferred, perforate the rolled portion of dough upon the apron, it being understood that the apron carrying the portion of dough moves with a step-by-step movement, and that it is of course stationary at the instant that the marker engages a portion of dough and marks it. The apron and the portion of dough that is being marked are supported during the marking operation by a table 120, which is attached to standards 121, extending upward from the frame. The marker is carried by a shank 122, itself attached to a cross-head 123, which reciprocates vertically in slots 124 in standards 121. (See Fig. 2.) Vertical reciprocatory movement is imparted to the cross-head and marker by means of connecting-rods 125, the upper ends of which are pivoted to the ends of cross-head 123, which extend outward beyond the standards, the other ends of said connecting-rods being pivoted upon crank-pins 38 and 39, extending from disks 35 and 36. (See Fig. 6.) It will be understood without further explanation that each rotation of shaft 33 and the disks, by means of the crank-pins, connecting-rods, and cross-head, will produce a reciprocation of the marker and will mark or perforate a portion of dough that will at the instant of its engagement by the marker be held stationary by the apron and be supported by table 120 in position to be operated upon.

After the marking operation the portion of dough is again carried forward by the apron, the next operation being the cutting out of the cake, and, secondary to that, the separation of the scraps of dough from the cake.

D denotes the cutter, which may of course be shaped to cut out a cake of any required size or shape. In the present instance, for convenience of illustration, we have shown a circular cutter which is carried by a shank 126, itself attached to a cross-head 127, adapted to reciprocate vertically in slots 128 in standards 129, which extend upward from the frame.

The apron and the portion of dough are stationary while the cake is being cut out and are supported by a table 130, which is attached to standards 129. Vertical reciprocatory movement is imparted to the cross-head and cutter by means of connecting-rods 131, one end of said connecting-rods being pivoted to the ends of the cross-head and their other ends to rock-levers 132, which have their fulcrums on a cross-rod 133. (See Figs. 1 and 2.) At the other ends of the rock-levers are rollers 134, which engage cam-grooves 37 in disks 35 and 36 on shaft 33. It will be obvious, therefore, that each rotation of shaft 33 and the disks will produce an oscillation of the rock-levers, and by means of the connecting-rods an upward-and-downward movement of the cross-head and cutter, it being understood, as stated above, that the apron and the portions of dough are stationary at the instant the cutting operation takes place. The cutter is shown as provided on opposite sides with radial scrap-cutters 135, the purpose of which is to separate the scrap remaining after a cake has been cut out into pieces, which are pushed away from cutter D by scrap-clearers, which we have indicated as a whole by E. These scrap-clearers comprise plates 136, carried by levers 137 and 138, which have their fulcrums on the under side of cross-head 127, as at 139. Levers 137 and 138 are oscillated, respectively, by connecting-rods 140 and 141, the opposite ends of which are pivoted to an arm 142, which is secured to and oscillated by a rock-shaft 143. The upper end of the rock-shaft passes freely through eyes 144, which extend outward from cross-head 127, (see Figs. 9 and 11,) said eyes sliding freely on the rock-shaft. Arm 142 lies below eyes 144 and is provided with a return-bend 145, having an eye 146, which lies between eyes 144. Eye 146 is shown as secured to the rock-shaft by a key 147, which permits arm 142 to move freely up and down with the cross-head, while oscillation of the rock-shaft will swing said arm, as indicated by dotted lines in Fig. 10, and by means of connecting-rods 140 and 141 will oscillate levers 137 and 138, which carry the scrap-clearing plates 136. The extreme outward movement of levers 137 and 138 and the scrap-clearing plates is clearly indicated by dotted lines in Fig. 10. In use at the instant the cake is cut out from the rolled portion of dough the scrap surrounding the cake is separated into two parts by the radial scrap-cutters 125, which parts are an instant later pushed away from the cutter by the outward movement of clearing-plates 136. This enables the operator, if necessary, to pick up the scrap, which is wholly separated from the cake, without an instant's delay and to dispose of it in any suitable manner. In the present instance the scrap is mechanically disposed of by means of a scrap-carrying apron, presently to be described. It will be clearly understood from the above that the cutter, clearing mechanism, and operating-arm 142 move upward and downward with the cross-head, the operating-arm being keyed to the rock-shaft so as to be oscillated thereby. The lower end of the rock-shaft is supported by an eye 148, extending outward from the frame, and is retained in place by collars 149 above and below the eye.

150 denotes an arm rigidly secured to the rock-shaft and extending outward therefrom, and 151 a connecting-rod, one end of which is pivoted to arm 150, and the other to an arm 152, the opposite end of which is mounted to oscillate on cross-rod 54. (See Fig. 6.) Arm 152 also carries a roller 153, which engages the cam-groove 34 in gear-wheel 32 on shaft 33. It will be readily understood, therefore, that each rotation of the gear-wheel through the engagement of roller 153 with the cam-groove and by means of connecting-rod 151 will cause an oscillation of rock-shaft 143, which in turn will operate the scrap-clearing plates. In practice connecting-rod 151 is made adjustable, and universal or double-acting joints are provided at each end of said rod, as the connections of said rod to arms 150 and 152 must permit movement in both the horizontal and vertical planes.

For convenience in disposing of the scrap-dough remaining on apron 44 after the cakes have been removed we provide below the operative parts of the machine an endless scrap-carrying apron 154, carried by rollers 155, whose shafts 156 are journaled upon the frame at opposite ends of the machine.

157 denotes an arm mounted to oscillate on one of the shafts 156, in the present instance the right-hand shaft as seen in Fig. 2, which carries a pawl 158, which in turn engages a ratchet 159, rigidly secured to the shaft, by which said shaft and the scrap-carrying apron are driven with a step-by-step movement. The left-hand shaft 156 may or may not be driven, as preferred. In the present instance we have shown one shaft only as driven.

160 denotes a connecting-rod, one end of which is pivoted to arm 157, the other being connected to a sleeve 161, which turns freely on crank-pin 39. (See Fig. 6 in connection with Fig. 2.) It will be seen, therefore, that rotation of shaft 33 and disk 36, carrying crank-pin 39, will impart oscillatory movement to arm 157 and through the engagement of the pawl with the ratchet will impart a step-by-step movement to the right-hand shaft 156 and the right-hand scrap-carrying apron-roller.

It will be obvious from Fig. 2 that apron 44 moves from left to right. Scrap-carrying apron 154, however, moves in the opposite direction—that is to say, from right to left. In use pieces of scrap are allowed to remain on apron 44, the cakes, however, being removed by the operators as soon as they are cut out. The pieces of scrap remaining on apron 44 will be carried forward by the latter to the end of the machine, where they will drop off from apron 44 upon an inwardly-inclined slide 162, (see Figs. 1 and 2,) from which said pieces of scrap will pass onto scrap-carrying apron 154 and by said apron will be carried back to the starting end of the machine, in the present instance the left end, where they may be deposited in a suitable receptacle (not shown in the drawings) and afterward returned to the mixer.

The operation of the machine as a whole has been so fully described in describing the several mechanisms and their operations as hardly to require description in detail. It is sufficient for the present purpose to say that the dough as it is forced from the mixer is cut into portions, which drop upon an endless apron by which they are carried forward and submitted to a succession of rolling operations, the portions of dough being dusted with dry flour before each rolling operation. After the last rolling operation each portion of dough is subjected to the action of a marker, which preferably perforates or nearly perforates the portion of dough in many places. After leaving the marker each portion of dough is subjected to the action of the cutter, which cuts out the cake ready for baking, scrap-clearing devices being provided which clear away the scrap from the cutter, so that the cake may be readily removed. The operators by means of peels or suitable implements remove the cakes from the apron for drying and baking, the action of the machine being continuous.

As already stated, with two operators to remove cakes from the apron the machine may be speeded to make twenty-eight cakes per minute, more or less, and by providing an additional operator to remove the cakes may be speeded to make forty cakes per minute, more or less.

Having thus described our invention, we claim—

1. In a machine of the character described the combination with a mixer provided with means for forcing dough therefrom, of a mechanically-operated cut-off located at the outlet end of the mixer and which separates the dough into portions, an endless apron moving with a step-by-step movement upon which the portions fall and a pair of kneading-rolls between which the apron passes and by which the portions of dough are successively rolled, opposing rolls being free from a positive driving connection with one another.

2. In a machine of the character described the combination with a mixer provided with means for forcing dough therefrom, of a mechanically-operated cut-off located at the outlet end of the mixer and which separates the dough into portions, an endless apron moving with a step-by-step movement upon which the portions fall, a dusting-box and tapping mechanism therefor to dust each portion of dough with dry flour when beneath it and a pair of kneading-rolls between which the apron passes and by which the portions of dough are successively rolled, opposing rolls being free from a positive driving connection with one another.

3. In a machine of the character described the combination with a mixer provided with means for forcing dough therefrom, of a mechanically-operated cut-off located at the outlet end of the mixer and which separates the dough into portions, an endless apron moving with a step-by-step movement upon which the portions fall, a plurality of pairs of kneading-rolls between which the apron passes and by which the portions of dough are rolled, the lower roll being loosely mounted and free from a positive driving connection with its opposing roll, a corresponding number of dusting-boxes lying above the apron, tapping mechanism for each box and operating mechanism whereby each box is caused to dust with dry flour a portion of dough beneath it.

4. In a machine of the character described the combination with a mixer provided with means for forcing dough therefrom, of a mechanically-operated cut-off located at the outlet end of the mixer and which separates the dough into portions, an endless apron moving with a step-by-step movement upon which the portions fall, a plurality of pairs of kneading-rolls between which the apron passes and by which the portions of dough are rolled, the lower roll being loosely mounted and free from a positive driving connection with its opposing roll, a dusting-box lying above the apron and back of each pair of rolls, a tapping-hammer corresponding with each dusting-box and operating mechanism whereby each hammer is caused to strike the corresponding box and dust the portion of dough beneath the box with dry flour.

5. In a machine of the character described the combination with a dough-carrying apron and a pair of kneading-rolls, between which the apron passes, opposing rolls being free from a positive driving connection with one another, of a dusting-box and mechanism for tapping the box whereby the portions of dough are dusted with dry flour when beneath the box.

6. In a machine of the character described the combination with a dough-carrying apron, kneading-rolls between which the apron passes, opposing rolls being free from a positive driving connection with one another, a dusting-box and tapping mechanism therefor, of a reciprocating marker for marking the rolled portions of dough and a table under the marker over which the apron passes.

7. In a machine of the character described the combination with a dough-carrying apron, kneading-rolls between which the apron passes, opposing rolls being free from a positive driving connection with one another, a dusting-box and tapping mechanism therefor, of a reciprocating cutter for cutting out cakes from the rolled portions of dough and a table under the cutter over which the apron passes.

8. In a machine of the character described the combination with a dough-carrying apron, kneading-rolls between which the apron passes, a dusting-box and tapping mechanism therefor, of a cutter for cutting out cakes from the rolled portions of dough, radial scrap-cutters extending from the cutter whereby the scrap is separated into pieces, a table under the cutter over which the apron passes and mechanism for reciprocating the cutter.

9. In a machine of the character described the combination with a dough-carrying apron, kneading-rolls between which the apron passes, a dusting-box and tapping mechanism therefor, of a cutter for cutting out cakes from the rolled portions of dough, radial scrap-cutters extending from the cutter to separate the scrap into pieces and scrap-clearers whereby the pieces of scrap are pushed away from the cutter to permit convenient removal of the cakes.

10. In a machine of the character described the combination with a dough-carrying apron, kneading-rolls between which the apron passes, a dusting-box and tapping mechanism therefor, of a cutter for cutting out cakes from the rolled portions of dough, radial scrap-cutters extending from the cutter to separate the scrap into pieces, scrap-clearers for pushing the pieces away from the cutter, a table under the cutter over which the apron passes and mechanism for reciprocating the cutter and scrap-clearers.

11. In a machine of the character described the combination with a dough-carrying apron, kneading-rolls between which the apron passes, opposing rolls being free from a positive driving connection with one another, a dusting-box and tapping mechanism therefor, of a marker for marking the rolled portions of dough, a cutter for cutting out cakes therefrom and mechanism for clearing away the scrap from the cutter.

12. In a machine of the character described the combination with a dough-carrying apron and kneading-rolls between which the apron passes, opposing rolls being free from a positive driving connection with one another, of a marker for marking the rolled portions of dough.

13. In a machine of the character described the combination with a dough-carrying apron and kneading-rolls between which the apron passes, opposing rolls being free from a positive driving connection with one another, of a cutter for cutting out cakes from the rolled portions of dough.

14. In a machine of the character described the combination with a dough-carrying apron and kneading-rolls between which the apron passes, opposing rolls being free from a positive driving connection with one another, of a marker for marking the rolled portions of dough and a cutter for cutting out cakes therefrom.

15. In a machine of the character described the combination with a mixer having means for forcing dough therefrom, a mechanically-operated cut-off for separating the dough into portions, said cut-off being located at the outlet end of the mixer and a carrying-apron upon which the portions of dough fall, of kneading-rolls between which the apron passes, opposing rolls being free from a positive driving connection with one another, and a marker for marking the rolled portions of dough.

16. In a machine of the character described the combination with a mixer having means for forcing dough therefrom, a mechanically-operated cut-off for separating the dough into portions, said cut-off being located at the outlet end of the mixer, and a carrying-apron upon which the portions of dough fall, of kneading-rolls between which the apron passes, opposing rolls being free from a positive driving connection with one another, and a cutter for cutting out cakes from the rolled portions of dough.

17. In a machine of the character described the combination with a mixer having means for forcing dough therefrom, a mechanically-operated cut-off for separating the dough into portions, said cut-off being located at the outlet end of the mixer, and a carrying-apron upon which the portions of dough fall, of kneading-rolls between which the apron passes, opposing rolls being free from a positive driving connection with one another, a cutter for cutting out cakes from the rolled portions of dough and mechanism for clearing the scrap away from the cutter.

18. In a machine of the character described the combination with a dough-carrying apron and kneading-rolls between which the apron passes, of a vertically-moving cross-head, a cutter carried thereby, a table under the cutter over which the apron passes, scrap-clearers also carried by the cross-head and mechanism for operating the scrap-clearers the instant the cutting operation is completed.

19. In a machine of the character described the combination with a dough-carrying apron and kneading-rolls between which the apron passes, of a vertically-moving cross-head, a cutter carried thereby, levers pivoted to the cross-head, scrap-clearing plates carried by the levers which operate in the plane of the cutter, a vertical rock-shaft, an arm carried by the cross-head and keyed to the rock-shaft so as to slide thereon with the cross-head and be oscillated by the rock-shaft and connecting-rods pivoted to said arm and to the levers respectively whereby the scrap-clearing plates are operated.

20. In a machine of the character described the combination with a vertically-reciprocating cross-head, a cutter carried thereby and provided with radially-extending scrap-cutters, levers pivoted to the cross-head and scrap-clearing plates carried by the levers and adapted to act in opposite directions from one of the scrap-cutters, of a rock-shaft, an arm keyed to the rock-shaft so as to slide thereon and be oscillated thereby and also connected to the cross-head so as to reciprocate therewith and connecting-rods pivoted to said arm and to the levers respectively.

21. In a machine of the character described the combination with a vertically-reciprocating cross-head having eyes 144, a cutter carried by the cross-head, levers pivoted to the cross-head and scrap-clearing plates carried by the levers, of a rock-shaft which passes freely through the eyes, an arm 142 having a return-bend which is keyed to the rock-shaft between the eyes so as to be oscillated by the rock-shaft and moved vertically with the cross-head and connecting-rods pivoted to the arm and to the levers respectively.

22. In a machine of the character described the combination with a dough-mixer, a mechanically-operated cut-off, kneading-rolls, a cutter and a table under the cutter, of an apron 44 upon which portions of dough fall when cut off and which passes between the kneading-rolls and between the cutter and the table, and mechanism for imparting a step-by-step motion to the apron, the parts being so timed that the apron will be stationary when the cutting operation takes place, opposing kneading-rolls being free from a positive driving connection with one another.

23. In a machine of the character described the combination with a dough-mixer, a mechanically-operated cut-off, kneading-rolls, a marker, mechanism for imparting reciprocatory motion thereto and a table under the marker, of an apron 44 upon which portions of dough fall when cut off and which passes between the kneading-rolls and between the marker and the table and mechanism for imparting a step-by-step motion to the apron, the parts being so timed that the apron will be stationary when the marker acts upon a portion of dough, opposing kneading-rolls being free from a positive driving connection with one another.

24. In a machine of the character described the combination with a dough-mixer having means for forcing dough therefrom and a spout, of a mechanically-operated cut-off in said spout, an apron 44 upon which portions of dough fall, kneading-rolls between which the apron passes, opposing rolls being free from a positive driving connection with one another and a cutter for cutting out cakes from the rolled portions of dough.

25. In a machine of the character described the combination with a dough-mixer having means for forcing dough therefrom and a spout, of a mechanically-operated cut-off in said spout, an apron 44 upon which portions of dough fall, kneading-rolls between which the apron passes, opposing rolls being free from a positive driving connection with one another, a cutter for cutting out cakes from the rolled portions of dough and which is provided with radial cutters for separating the scrap into pieces and mechanically-operated scrap-clearers whereby the scrap is cleared away from the cutters.

26. In a machine of the character described the combination with a dough-mixer, a cut-off, an apron 44 upon which the portions of dough fall, kneading-rolls between which the apron passes, opposing rolls being free from a positive driving connection with one another, a cutter and scrap-clearers, of a slide 162 upon which the pieces of scrap fall from apron 44 and a scrap-carrying apron 154 below the slide by which the pieces of scrap are carried to the starting end of the machine.

27. In a machine of the character described the combination with a dough-mixer, a cut-off, kneading-rolls and a cutter, of an endless dough-carrying apron passing between said kneading-rolls, rolls by which said apron is carried and mechanism for adjusting the ends of one of said rolls independently, opposing kneading-rolls being free from a positive driving connection with one another.

28. In a machine of the character described the combination with a dough-mixer, kneading-rolls, an endless dough-carrying apron and rolls by which said apron is carried, of bearing-sleeves in which the rolls are journaled and which are provided in opposite sides with sockets, and longitudinally-adjustable bearings having openings to receive the sleeves and teats and set-screws to engage the sockets, the longitudinal movement of the bearings and the oscillatory movement of the sleeves permitting adjustment of each end of the shaft independently.

29. In a machine of the character described the combination with kneading-rolls, an endless dough-carrying apron and rolls by which said apron is carried, of bearing-sleeves in which the rolls are journaled and which are provided in opposite sides with sockets, sliding bearings having openings to receive the sleeves and teats and set-screws to engage the sockets whereby oscillatory movement of the sleeves is permitted, set-screws for moving the bearings to tighten the apron and to prevent backward movement and means for locking the bearings against movement in the opposite direction.

30. In a machine of the character described the combination with a frame, kneading-rolls, an endless dough-carrying apron and rolls by which said apron is carried, of bearing-sleeves in which the rolls are journaled and which are provided in opposite sides with sockets, bearings which slide upon the frame and are provided with openings to receive the sleeves and teats and set-screws to receive the sockets and means for locking the bearings to the frame.

31. In a machine of the character described the combination with kneading-rolls, an endless dough-carrying apron, rolls by which said apron is carried and shafts by which the rolls are carried, of oscillatory sleeves in which the shafts are journaled, sliding bearings by which the sleeves are carried and means for locking the bearings in position.

32. In a machine of the character described the combination with an endless dough-carrying apron and upper and lower kneading-rolls between which the apron passes, of sleeves in which the upper kneading-roll is journaled and which are provided in opposite sides with sockets, teats and set-screws which engage the sockets and permit oscillation of the sleeves, slides in which the lower kneading-roll is journaled, bearing-boxes for the slides and means for adjusting the slides vertically in the boxes.

33. In a machine of the character described the combination with an endless dough-carrying apron and pairs of upper and lower kneading-rolls between which the apron passes, the upper kneading-roll of each pair carrying a bevel-pinion 93, of sleeves in which the upper kneading-rolls are journaled and which are provided in opposite sides with sockets, teats and set-screws which engage the sockets and permit oscillation of the sleeves, and a shaft 95 carrying bevel-pinions 94 which engage bevel-pinions 93 and drive the upper kneading-rolls.

In testimony whereof we affix our signatures in presence of two witnesses.

PER AUGUST SODERHOLM.
MAURITZ OLSON.

Witnesses:
A. M. WOOSTER,
S. W. ATHERTON.